(12) United States Patent  
Chen

(10) Patent No.: US 7,675,953 B2
(45) Date of Patent: Mar. 9, 2010

(54) METHOD AND DEVICE FOR PRODUCING LASER USED DIRECTLY AS A FREQUENCY STANDARD OF OPTICAL FREQUENCY

(75) Inventor: Jingbiao Chen, Haidian District (CN)

(73) Assignee: Peking University, Beijing (CN)

( * ) Notice: Subject to any disclaimer, the term of this patent is extended or adjusted under 35 U.S.C. 154(b) by 465 days.

(21) Appl. No.: 11/502,321

(22) Filed: Aug. 9, 2006

(65) Prior Publication Data

US 2007/0116080 A1 May 24, 2007

(30) Foreign Application Priority Data

Nov. 18, 2005 (CN) .................... 2005 1 0086934

(51) Int. Cl.
*H01S 3/14* (2006.01)

(52) U.S. Cl. .......................................... 372/39; 372/70

(58) Field of Classification Search .................. 372/39, 372/70

See application file for complete search history.

(56) References Cited

U.S. PATENT DOCUMENTS 5,859,867 A * 1/1999 An et al. ........................ 372/70

OTHER PUBLICATIONS

The American Physical Society; vol. 56, No. 2, pp. 1662-1665, dated Aug. 1997.

* cited by examiner

*Primary Examiner*—Minsun Harvey
*Assistant Examiner*—Tod T Van Roy
(74) *Attorney, Agent, or Firm*—Merchant & Gould P.C.

(57) ABSTRACT

The present invention provides a method for producing laser used directly as a frequency standard of optical frequency, comprising: a collimated atomic beam used as laser gain medium; the laser gain medium being put in vacuum; before the particles of the laser gain medium entering a laser resonant cavity, a laser device controlled independently providing pump laser irradiation to produce an inversion of atomic population number between energy levels of the particles of the laser gain medium for achieving cavity mode frequency line width $\Gamma_{cavity}$ of longitudinal mode of the laser resonant cavity larger than frequency line width $\Gamma_{gain}$ of gain of the used laser gain medium. And the frequency line width of the laser outputted used by the laser device contracted by the present invention can attain less than 1 Hz and the outputting laser frequency is very steady. So the laser produced by the present invention can be used directly as a quantum frequency standard of optical frequency.

4 Claims, 2 Drawing Sheets

METHOD AND DEVICE FOR PRODUCING LASER USED DIRECTLY AS A FREQUENCY STANDARD OF OPTICAL FREQUENCY

FIELD OF THE INVENTION

The present invention relates to the technical field of frequency standard of optical frequency and concretely relates to a method and device for producing laser used directly as a frequency standard of optical frequency.

BACKGROUND OF THE INVENTION

Up to present, all of high accuracy and high stability frequency standards of optical frequency belong to passiveness mode, namely the frequency of laser output to user is passively locked at a quantum transition line of atom by using frequency discrimination and phase discrimination technology. Although there are many known quantum transition lines with quite narrow line width, the best frequency line width of the laser sources for frequency discrimination is around one Hz. Thus, the possibility realizing more precise resolution in the frequency domain is limited. Additionally, the most serious disadvantage of this laser sources is using the optical frequency resonant cavity as reference. So all kinds of outside noises which affect the line width of the Optical Frequency resonant cavity, such as seismic noise, air sound wave noise etc., decide that the realized line width is around one Hz.

At present, all the frequency standards of optical frequency are consist of two parts on the concrete structure. One is atoms, ions and molecules which provides quantum absorption line, and the other is the laser device with stable cavity used as local oscillator. While the disadvantages of the lasers with stable cavity are that its outputting frequency is fluctuating and drifting closely following with the change of the length of the cavity.

SUMMARY OF THE INVENTION

The present invention overcomes the deficiency of prior art of frequency standard of optical frequency and provides a method and device for producing laser used directly as a frequency standard of optical frequency.

The technical solution of the present invention is that: a method for producing laser used directly as a frequency standard of optical frequency comprising:

a collimated atomic beam is used as laser gain medium; the laser gain medium is put in vacuum;

before particles of the laser gain medium entering laser resonant cavity, a laser device controlled independently provides pumping laser irradiation to produce an inversion of atomic population number between energy levels of the particles of the laser gain medium to achieve that frequency mode line width $\Gamma_{cavity}$ of individual longitudinal mode of the laser resonant cavity is larger than gain frequency line width $\Gamma_{gain}$ of the used laser gain medium; which achieves laser outputting under the special condition that the mode line width $\Gamma_{cavity}$ of cavity is larger than five times gain frequency line width $\Gamma_{gain}$.

For the laser gain beam medium in beam state, a pumping parameter r of the laser is adjusted by adjusting intensity of particle beam so as to adjust power of outputting laser for optimizing needed performance parameter possess by the outputting laser to a best value and the pumping parameter r perfectly is from 1.5 to 3.

The atomic beam is different kinds of atoms, molecules or ions.

The vacuum degree of vacuum chamber is higher than that of $10^{-6}$ torr.

A device for producing laser used directly as a frequency standard of optical frequency, comprising: a vacuum chamber body, disposed with atomic oven, pumping laser device, optical frequency resonant cavity consisting of two cavity mirrors and a control system in it; atomic beam being ejected from the nozzle of atomic oven, after collimated entered into pumping section to operate with pumping light and released in the form of stimulated radiation emission within the cavity of optical frequency cavity in the vacuum can so as to output laser used directly as a frequency standard of optical frequency.

The two cavity mirrors of the laser resonant cavity are fixed on the cavity-spacer processed by material of low coefficient of thermal expansion and is connected to the vacuum chamber body.

The whole laser resonant cavity body is hold inside in the vacuum chamber by the wire.

The vacuum chamber body is disposed with a pinhole diaphragm in it for collimating the atomic beam.

The vacuum chamber body is disposed with several light windows for inputting and outputting the laser.

The technical effects of the present invention are that: the cavity mode line width of the laser resonant cavity is larger than the gain line width of the medium atom. And atoms, molecules and ions used as laser gain medium are having gain line width smaller than that of traditional laser, and the laser spectrum line of the gain mediums is less influenced by the spectrum line widened and shifted for the external factors, so the present invention has following three specific advantages compared with all of the frequency standards of optical frequency in prior art:

1. two completely different compositions in physics of all present frequency standards of optical frequency, namely quantum absorbers particle and local oscillator, are merged in one physical component to realize quantum frequency standard of optical frequency.
2. the line width of laser output is narrower than that of the best laser in prior art.
3. the change of cavity length of the laser cavity will not directly influence the frequency of the outputting laser so as to be reduced to a small fluctuating scope.

BRIEF DESCRIPTION OF THE DRAWINGS

The solution provided by the present invention will be better understood from the following, detailed description of preferred embodiments of the invention with reference to the drawings.

Figure 1:
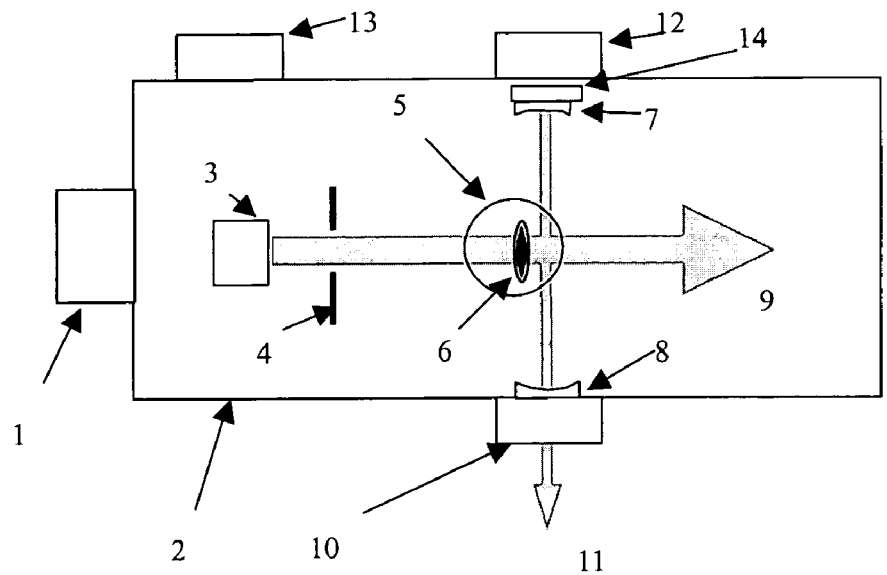
FIG. 1 is a structural sketch drawing of a device for producing laser used directly as a frequency standard of optical frequency.

1—ion pump; 2—vacuum chamber; 3—atomic oven; 4—collimating slit; 5—pumping light window; 6—pumping laser; 7—laser cavity mirror 1: high reflector; 8—laser cavity mirror 1: low reflector; 9—atom beam; 10—light window; 11—outputting laser used directly as a frequency standard of optical frequency; 12—standby light window; 13—control circuit; 14—piezoelectric ceramic plate.

DETAILED DESCRIPTION OF THE PREFERRED EMBODIMENTS

On the basis of attaining two conditions of composed a laser resonant cavity and achieving inversion of population number between energy levels of the particles of laser gain medium being necessary for a general laser device, for achieving concrete technical guideline of the present invention $\Gamma_{cavity} \geq 5\Gamma_{gain}$, one of the achieving method is adjusting gain line width $\Gamma_{gain}$, the other is adjusting mode cavity line width $\Gamma_{cavity}$.

The detailed description of concrete technical method and technical effect of adjusting the line width $\Gamma_{cavity}$ of longitudinal mode of the laser resonant cavity is as following: the first is composing laser resonant cavity by choosing cavity mirror with fit reflectance for adjusting the line width $\Gamma_{cavity}$ of longitudinal mode of the laser resonant cavity in technique so as to satisfy capability demand of outputting laser. The second is adjusting the line width $\Gamma_{cavity}$ of longitudinal mode of the laser resonant cavity by choosing the fit length of the laser resonant cavity.

Actualizing technology relative to adjust the gain frequency line width $\Gamma_{gain}$ of laser gain medium includes: reducing spectrum line broadening caused by transit time by reducing motion velocity of gain medium particles and enlarging cavity mode dimension of laser resonant cavity, reducing spectrum line broadening caused by Doppler effect and effect of theory of relativity by reducing motion velocity of gain medium particle; reducing spectrum line broadening caused by Doppler effect through mechanical narrow slit or small diaphragm and reducing transverse velocity distributing of beam medium used laser cooling technique for laser gain beam medium in beam state, reducing spectrum line broadening caused by wave vector direction distributing by adjusting cavity mode dimension of laser resonant cavity, reducing spectrum line broadening caused by several kinds of collisions by non-implement wall collision character and intimate non-collision character by using laser gain beam medium produced in vacuum chamber body, reducing spectrum line broadening caused by high-power spectrum line saturation effect by adjusting laser pumping ratio to adjust power of outputting laser, reducing spectrum line broadening caused by asymmetry and undulation of environment electromagnetism field by adjusting uniformity of adscititious electromagnetism field.

Reducing effect of noise of outputting laser caused by the change of cavity length of the laser resonant cavity, in concrete technical method, on one side the proportion a=(Γcavity/Γgain) is increased, which is processed by two methods described above. On the other side, the cavity length is fixed in mechanism. The two cavity mirror are fixed on a cavity-spacer processed by material with low coefficient of thermal expansion and the whole laser resonant cavity is hold inside the vacuum chamber body by a wire or fixed in the vacuum chamber body by soft connecting to reduce noise effect of the change of cavity length of laser resonant cavity caused by undulate of vibration, sound wave and temperature.

Figure 2:
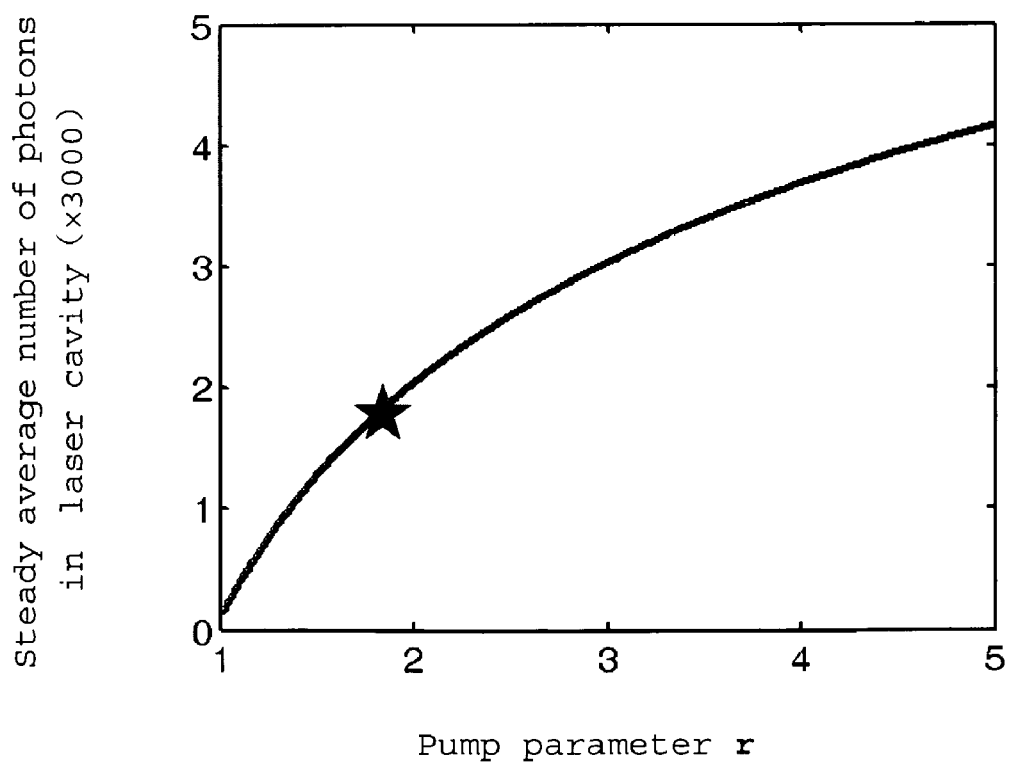
FIG. 2 is a relationship sketch drawing of pumping parameter and steady average photon number in cavity within vacuum chamber.
Figure 3:
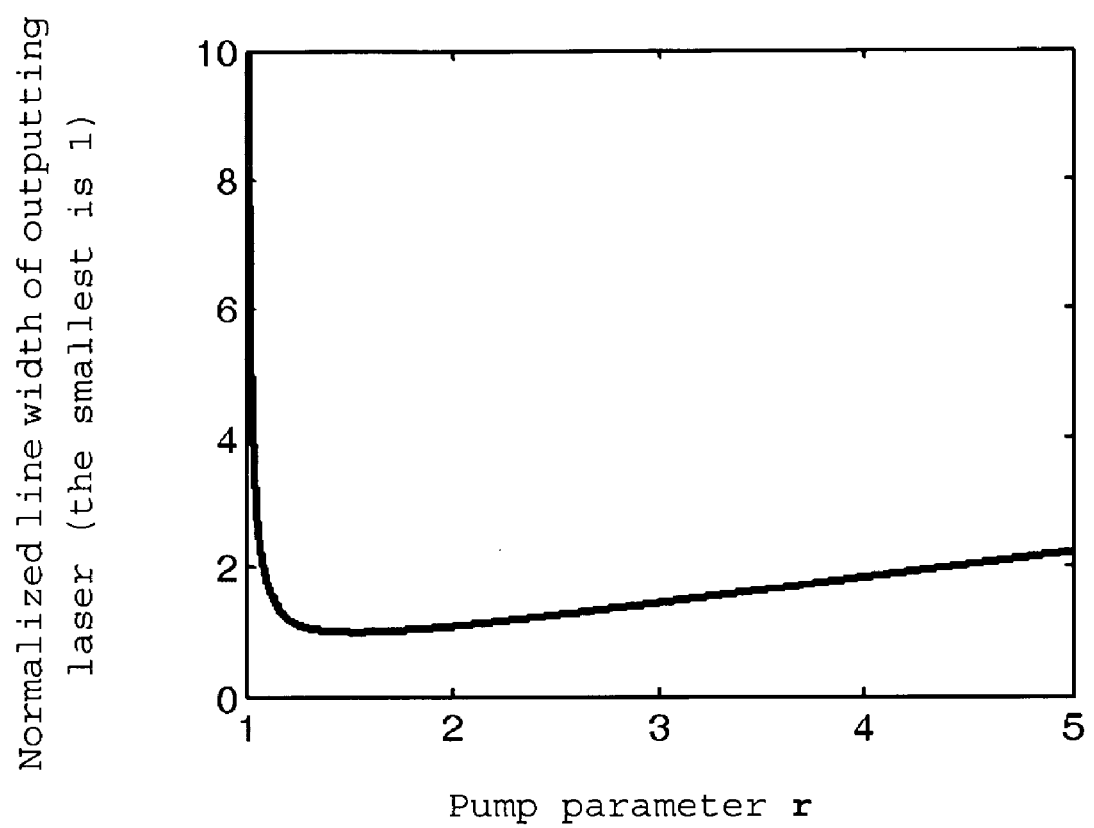
FIG. 3 is a relationship sketch drawing of pumping parameter and line width of outputting laser.

For laser gain beam medium in beam state, pumping parameter r of the laser is adjusted by adjusting intensity of particle beam so as to adjust power of outputting laser for optimizing needed performance parameter possess by the outputting laser to the best value to adjust the average photon number n in the laser resonant cavity to make it quite large so as to reduce frequency line width of outputting laser and not make it too large to take power saturation effect in an acceptable scope. As shown in FIG. 2 and FIG. 3, the pumping parameter r is the best about from 1.5 to 3. An aim of this optimizing technology is to get outputting laser with the narrowest line width, and at the same time to guarantee enough power of the outputting laser. On the other side, it is within the scope permitted by flux of particle beam.

When the laser gain medium is atomic beam, molecular beam or ions beam located in the vacuum chamber, the influence of several kinds of interaction factors with environment to laser gain medium spectrum line is reduced greatly so as to get the condition of narrower linewidth of laser gain medium satisfying the demand of ratio coefficient a=($\Gamma_{cavity}/\Gamma_{gain}$) $\geq 5$. Example as calcium atom beam is that calcium atomic oven equipped with calcium metal is heated up to about 650 centigrade in a vacuum chamber body. Heated calcium atomic beam ejected from a collimating slit is acted as the laser gain medium. The flux of atomic beam is decided by oven body temperature control. If the laser gain medium is ion beam, the velocity and flux of beam are adjusted by using electric field. Different kinds of concrete particle beam may have different kinds of beam producing method. Before particles of the laser gain medium entering laser resonant cavity, a laser device controlled independently provides pumping laser irradiation to produce an inversion of atomic population number between energy levels of the particles of gain medium so as to get enough flux of gain medium particle beam to satisfy surge condition of laser threshold. The concrete method also includes that laser gain medium with multiple energy levels is pumped inside the cavity directly. The laser gain medium also can be available particles after laser cooling and trapping or any laser gain medium which satisfy the (1) said condition because of the enough little effect of energy level's bearing environment.

A structure of a device for producing laser used directly as a frequency standard of optical frequency, as shown in FIG. 1, is described as following:

The present invention includes vacuum chamber body 2 kept high vacuum by ion pump 1, atomic oven 3, collimating slit 4, pump laser 6, laser cavity mirror 7 and 8 and control circuit 13.

There are a light window 5, a light window 11 and a light window 12 located on propriety position of the vacuum chamber. Atomic beam 9 is produced by atomic oven 3 after being heated up. Electric current of heating coil and temperature of the atomic oven 3 are adjusted by control circuit 13.

Said invention is achieved in high vacuum chamber body 2 necessarily. High vacuum degree in the vacuum chamber body is demanded keeping by ion pump connected with it in a long-term time. There are light windows 5, 11 and 12 located on propriety position of the vacuum chamber 2 so as to output and input the vacuum chamber 2 when laser is coupled. And fibers may be equipped in the vacuum chamber to output the laser by fiber coupling.

There is an atomic oven 3 being capable of producing atomic beam in the high vacuum chamber body. The needed temperature of the atomic oven depends on factors such as the used atom and the needing flux of atom etc.

An optical frequency resonant cavity is made up of the cavity mirror 7 and 8 and laid on a vertical transit position along the direction of the atomic beam 9 in the vacuum chamber body 2.

The optical frequency resonant cavity made up of the cavity mirror 7 and 8 and cavity spacer can be processed by glass or ceramic with low coefficient of thermal expansion. Namely the cavity mirror 7 and 8 are fixed on the cavity spacer processed by glass or ceramic with low coefficient of thermal expansion. Mode central frequency of the optical frequency resonant cavity made up by the cavity mirror 7 and 8 can be adjusted by temperature control or be achieved by piezoelectric ceramic plate 14 added in one terminal of cavity spacer. In working state, the central frequency of the laser cavity is adjusted to the atomic transition spectrum line and locked on this transition frequency. The said locking is achieved by the control circuit 13. The temperature of the control cavity or control piezoelectric ceramic plate 14 is also achieved by the control circuit 13.

The satisfied mode line width of the cavity of the optical frequency resonant cavity which is made up of the cavity mirror 7 and 8 must be larger than the gain line width of the medium atom, which is one of the main characters of the present invention.

Adscititious pump light 6 pumps the atom from ground state to excited state before the atomic beam entering the optical frequency resonant cavity which is made up of the cavity mirror 7 and 8 to achieve the needed inversion of atomic population number in laser theory.

The connection relation, function effect and necessary demand of each parts of active frequency standard of optical frequency:

The high vacuum chamber body 2 and ion pump 1 connecting with the high vacuum chamber body 2 are used to guarantee main body of the frequency standard of whole active optical frequency to work in high vacuum state in a long-term time as shown in FIG. 1. Vacuum degree is better than 10-6 torr.

Length of a vacuum tube can be shorter than 50 centimeter. The volume of ion pump is less than 1 liter. In a word, the pumping speed of the ion pump is adjusted according to the volume of vacuum chamber to satisfy the requirement that the vacuum degree is better than 10-2 torr.

The flux of atomic beam is decided by oven body temperature of the atomic oven 3 and area of oven nozzle aperture, namely how many atoms can be used in one unit time. The oven nozzle aperture is made up of long tubules. The length of the long tubule is around 0.5-2 cm and the diameter is around 0.1-0.5 mm, concretely according to demands such as the needed flux of atomic beam and divergence angle. To increase the flux and not to enlarge the divergence angle at the same time, the oven nozzle aperture can be composed by using array of long tubules.

After the atomic beam is ejected from the nozzle of atomic oven with high temperature through the nozzle aperture it can be collimated further by pinhole diaphragm 4. And the transverse divergence of atomic beam can be decreased by laser collimation via transverse laser cooling based on laser cooling technique.

The collimated atomic beam enters into pump section to process with pump light. The function of the pump light 6 is to pump the atomic from ground state to excited state. The energy atom got from the pumping light releases in the form of stimulated radiation emission within the cavity of optical frequency cavity in the vacuum chamber so as to output laser 11 used directly as a frequency standard of optical frequency.

The optical frequency resonant cavity is made up of the cavity mirror 7 and 8. If reflection coefficient of one of the cavity mirror 7 is much larger than reflection coefficient of the other cavity mirror 8, it is signal terminal outputting as FIG. 1. If the reflection coefficient of one of the cavity mirror 7 is the same as that of the other, it is two terminals outputting. The main character of the present invention namely necessary condition is that the optical frequency resonant cavity made up of the two cavity mirror must satisfy a necessary condition, namely mode line width of the optical frequency resonant cavity made up of 7 and 8 must be larger than gain line width of atom.

The light windows 5, 11 and 12 on the vacuum chamber and the other needed light windows are used to output and feed the laser. And in possible condition these light windows are substituted by fibers.

The light source of pumping light 6 can be provided by semiconductor laser device stabilized to stable cavity. The frequency of the pump light 6 is locked on needed special value of atomic transition line and it is achieved by circuit 13.

Last, for the laser used directly as frequency standards of the optical frequency, various modifications or changes may be made without departing from the scope covered in the claims of the present invention. More concretely, it should be understood that the present invention is not to limit the concrete forms of the laser gain medium, but be the same with laser gain medium laser in any forms, so long as the gain line width of the laser gain medium utilized in the laser device may be smaller than the satisfied cavity mode line width of the optical frequency resonant cavity.

What is claimed is:

1. A method for producing laser used directly as a frequency standard of optical frequency comprising:
   providing a collimated atomic beam as a laser gain medium; putting the laser gain medium in vacuum; before particles of the laser gain medium enter a laser resonant cavity, using a laser device controlled independently to provide a pump laser irradiation to produce an inversion of the population number between energy levels of the particles of the laser gain medium to achieve a condition in which frequency mode line width $\Gamma_{cavity}$ of an individual longitudinal mode of the laser resonant cavity is larger than gain frequency line width $\Gamma_{gain}$ of the laser gain medium.

2. The method for producing laser used directly as a frequency standard of optical frequency as claimed in claim 1, wherein for the laser gain beam medium in beam state, a pump parameter r of the laser is adjusted by adjusting the flux of particle beam so as to adjust power of outputting laser for optimizing needed performance parameter possessed by the outputting laser to a best value, and the pump parameter r is from about 1.5 to about 3.

3. The method for producing laser used directly as a frequency standard of optical frequency as claimed in claim 1, wherein the atomic beam is different kinds of atoms, molecules or ion beam.

4. The method for producing laser used directly as a frequency standard of optical frequency as claimed in claim 1, wherein vacuum degree in the vacuum chamber is higher than that of 10-6 torr.

* * * * *